United States Patent [19]
Clausen et al.

[11] 3,779,630
[45] Dec. 18, 1973

[54] REAR PROJECTION SCREEN AND METHOD OF MAKING SAME

[76] Inventors: Erik Clausen; Johannes Clausen, both of Farevejle, Denmark

[22] Filed: June 14, 1972

[21] Appl. No.: 262,671

[30] Foreign Application Priority Data
Dec. 16, 1971   Denmark .......................... 6158/71

[52] U.S. Cl. ................................. 350/117, 156/99
[51] Int. Cl. .......................................... G03b 21/56
[58] Field of Search .......................... 350/117, 126; 161/192; 156/99, 102

[56] References Cited
UNITED STATES PATENTS
1,204,401   11/1916   Brixey ................................. 350/126
3,437,405   4/1969   Northrop ........................ 350/126 X

*Primary Examiner*—Samuel S. Matthews
*Assistant Examiner*—Richard A. Wintercorn
*Attorney*—Watson, Cole & Watson

[57] ABSTRACT

A screen for rear projection comprising an intermediate sheet consisting of light conducting partly crystallized plastic material to opposite sides of which a cover sheet is adhered, light diffusing layers being arranged at the interfaces between the intermediate sheet and the cover sheets the latter having smooth outer surfaces.

8 Claims, 1 Drawing Figure

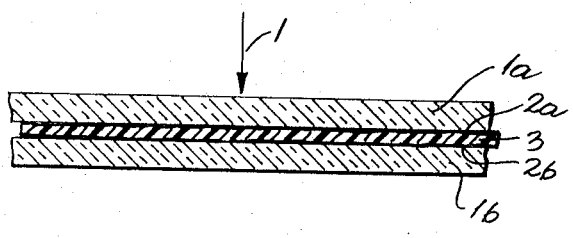

REAR PROJECTION SCREEN AND METHOD OF MAKING SAME

BACKGROUND OF THE INVENTION

Rear projection screens are known consisting of several different sheets and layers in order to form an image of a picture projected on the rear side of the screen by means of a projector. From U.S. Pat. No. 2,180,113 a translucent screen is e.g. known, consisting of two sheets of smooth clear glass between which a diffusing emulsion is provided. The emulsion is composed of a plurality of light transparent media having different indices of refraction. Moreover, from U.S. Pat. No. 2,380,241 a screen is known, consisting of three sheets wherein the outer surface of one of the sheets which faces the projector is rough and after this sheet two further sheets follow.

One of the problems which must be dealt with by such screens is the avoiding of points of scintillation, especially when the image is magnified e.g. 200 times from a small picture. Moreover, it is important that the screen have a good dissolving effect in order to be able to view the details of the image projected.

Accordingly, an object of the present invention is to provide a rear projection screen devoid of any points of scintillation and having good dissolving characteristics.

Another object of the present invention is to provide a screen having improved light distributing characteristics and a smooth appearance so as to make it possible for an observer to see the image even if he sees the image under an acute angle.

A further object of the present invention is to provide a method for the manufacture of such screens.

SUMMARY OF THE INVENTION

A screen for forming images projected to the screen from a projector arranged at the reverse side of the screen and viewed from the front side comprising in combination two cover sheets of transparent material one adhered to each side of an intermediate sheet consisting of light conducting partly crystallized plastic material, light diffusing layers being arranged at the interfaces between the intermediate sheet and the cover sheets and said cover sheets having smooth outer surfaces.

It has been proven that a screen constructed in accordance with the present invention avoids the forming of points of scintillation even when the image formed has been magnified up to 200 times from a micro slide. Presumably, this effect is due to the almost total refraction offered by the light diffusing layers combined with the light conducting and light refracting properties of the plastic sheet so that the light projected onto the screen will be arrested in and rediffused from the plastic sheet and give the screen a luminous appearance.

According to a preferred embodiment of the invention, the plastic material of the intermediate sheet may be polyethylene having a density of 0.920 g/cm$^3$, a degree of crystallization of 65 percent and a thickness between 0.5 – 0.7, preferably 0.6 mm. However, a smaller thickness of the plastic sheet may be used by using a high density polyethylene which has a greater degree of crystallization.

According to a further embodiment of the invention the light diffusing layers may consist of a transparent lacquer wherein light refracting particles are suspended. By means of this embodiment it is in a simple way possible to adjust the light diffusing degree of the layers.

However, the same result may be achieved, provided the surfaces of the cover sheets adhered to the intermediate sheet are frosted for forming the light diffusing layers. Under all circumstances the two light diffusing layers must be covered by cover sheets having smooth outer surfaces because such smooth outer surfaces prevent direct light entrance from the air into and direct light issue out into the air from the light diffusing layers and the light beams will always be caused to pass a smooth surface when entering the screen and the observer will always see a smooth surface. Due to the fact that no air spaces are present between the light diffusing layers and the plastic sheet the light refraction between the light diffusing layers and the plastic sheet will be rather small, but on the other hand it is believed that a compensation is achieved due to the fact that light which enters the plastic sheet will be arrested therein and rediffused therefrom due to the crystallization and the light conducting properties of the plastic.

When the present invention was made a further problem was to be solved due to the fact that light conducting crystalline plastic sheets having the thickness preferred according to the present invention, i.e., 0.6 mm, were not available on the market. Accordingly, it was not possible simply to buy a plastic sheet of the kind in question and to adhere two transparent cover sheets each having a frosted surface to opposite sides of the plastic sheet by means of a transparent lacquer between the plastic sheet and the frosted surfaces of the cover sheets. Due to the difficulties involved in buying plastic sheets of the kind in question having the correct thickness, the present method was devised using glass plates as cover sheets. The invention is carried out as follows:

A polyethylene sheet of low density and having a thickness greater than the thickness required is used together with a lacquer which remains fluid when heated. After placing the plastic sheet between the two cover plates with the lacquer interposed therebetween the assembly is heated to a temperature above the softening temperature of the plastic sheet followed by a compression of the assembly until the required thickness of the plastic sheet is achieved, and chilling the assemby to room temperature. By this method it is possible to achieve the required thickness of the plastic sheet. The reason for using a lacquer which remains fluid or semi-fluid when heated is that the plastic material and the glass have different coefficients of expansion and accordingly, by chilling the assembly the cover, plates may loose their adherence to the plastic sheet. However, by using a lacquer which remains fluid it will simultaneously act as a lubricant both during the heating and the chilling. It will be understood that if glass plates each having a smooth and a frosted surface are used a lacquer without light refracting particles is used. However, if both surfaces of each glass plate are smooth a lacquer wherein light refracting particles are suspended is used.

By carrying out the method explained above preferably a plastic sheet consisting of polyethylene of low density and having a softening temperature of approximately 120°C is used, and the assembly is heated to approximately 125°C. By such heating the polyethylene turns into a clear sirup-like consistency so that a compression to the required thickness is possible. By the chilling down to room temperature (during 3-5 minutes) the plastic sheet will re-crystallize. Polyethylene having a low density has a degree of crystallization of approximately 65 percent. Accordingly, it is possible to use a polyethylene sheet having a minor thickness and a high density which also has a high degree of crystallization. However, the latter material is not very suitable for the method according to the present invention because the final thickness of a high density polyethylene sheet should be of the order 0.3 mm and it is rather difficult to achieve such thickness and simultaneously to keep the tolerances sufficiently small.

BRIEF DESCRIPTION OF THE DRAWING

The drawing illustrates a section through an embodiment of the screen according to the invention.

DESCRIPTION OF THE PREFERRED EMBODIMENT

The screen illustrated is intended to be used as a rear projection screen especially for showing micro slides. In the drawing, a single incoming light beam 1 is shown. The beam enters a clear glass plate 1a and enters a light refracting layer 2a consisting of a lacquer wherein glass particles are suspended. The lacquer used in the embodiment illustrated is available under the trademark: "3 M Nr 4693" which remains fluid or semi-fluid when heated. The light refracting glass particles have a grain size between 5 $\mu$ and 50 $\mu$ and the lacquer contains in its dry condition 10-30 percent glass particles.

After the light diffusing layer 2a a polyethylene sheet 3 follows. The polyethylene used in the embodiment is of low density (0.920 g/cm$^3$) which has a degree of crystallization of 65 percent. After the polyethylene sheet a further layer 2b of the same kind as the layer 2a follows and finally a clear glass plate 1b. The screen illustrated is manufactured in the following way:

After coating one of the surfaces of each of the two glass plates 1a and 1b with the lacquer wherein the glass particles are suspended the glass plates are positioned at each side of a polyethylene sheet having a thickness greater than the final thickness required with the two coated surfaces facing the polyethylene sheet. The screen constructed in this way is now heated to a temperature above the softening temperature of the polyethylene, viz. approximately 125°C. By such heating the polyethylene will assume a clear and sirup-like consistency. The two plates 1a and 1b are now pressed towards each other in order to thin the polyethylene sheet to a thickness of approximately 0.6 mm. After the pressing operation this screen is chilled 3-5 min. to room temperature so that the degree of crystallization is restored.

The screen illustrated operates in the following way:

When the light beam 1 hits the smooth outer surface of the glass plate 1a the light beam will pass the glass plate without any refraction but will be diffused as soon as it enters the layer 2a. In the layer 2a the light beam will be split up and refracted generally in all directions, but the refraction degree is rather small compared wit the refraction to which the beam would be subjected if it continued out into the air from the layer 2a. The refraction degree is considerable reduced due to the fact that the light after having passed the layer 2a enters the polyethylene. The refracted beams will now be conducted through and along the polyethylene sheet and at the interface between the polyethylene sheet and the other light diffusing layer 2b 80-90 percent of the light will be reflected back into the polyethylene sheet 3. The remaining part of the light will pass the layer 2b as diffused light, but a portion thereof will be reflected at the smooth side of the glass plate 1b at the front side of the screen and will return to the layer 2b. Accordingly, the light will be arrested in the plastic sheet before it is rediffused from the plastic sheet through the layer 2b, the plate 1b and is issued as diffused light which the observer sees. Due to the fact that no air but polyethylene only is provided between the two layers 2a, 2b the refraction degree will be less than the refraction achieved if air spaces were provided but the reduced refraction is compensated by an improved dissolving degree of the image both viewed perpendicularly to the screen and under an acute angle. It is supposed that the improved dissolving degree is due to the fact that the light diffusing layers are very homogeneous due to the fact that they are enclosed at both sides. Moreover, the screen shows no points of scintillation presumably due to the interference which is caused between the two light refracting layers combined with the interposed plastic sheet having a small light refraction degree.

Instead of the embodiment illustrated two glass plates may be used of which the surfaces facing the intermediate sheet are frosted seeing that such frosting will substitute the glass particles in the layers 2a and 2b. In the latter case a clear lacquer is used between the two glass plates and the plastic sheet. If, in the manufacturing of the screen, a plastic sheet is used having a thickness geater than the thickness required, the screen may be manufactured as previously explained. However, if a plastic sheet having the required thickness was available the advantage aimed at would also be achieved by using a plastic sheet having the correct thickness and by adhering two transparent plates each having a frosted surface to the plastic sheet with the frosted surfaces facing the sheet by using a clear lacquer between the frosted surfaces of the cover plates and the opposite surfaces of the plastic sheet. In the latter case the lacquer need not remain fluid upon heating because the only effect which the lacquer has to fulfil is to fill the air spaces which otherwise would result between the frosted plates and the plastic sheet.

In the embodiments explained above polyethylene of low density which has also a comparatively small degree of crystallization, viz. 65 percent, is used. Polyethylene of high density (0.935–0.950) has a greater degree of crystallization, viz. 75 and 80 percent respectively. Accordingly, sheets made from the last mentioned materials and having a thickness less than the thickness used in the embodiments explained above may also be used for the screen according to the invention because the increased degree of crystallization of such materials can compensate for a reduced thickness.

Low density and high density polyethylenes suitable for screens according to the present invention are available from the English firm Stanely Schmidt c/o Middlesex as follows:

|  |  | Density | Degree Crystallization |
|---|---|---|---|
| Low Density | grade 2 | 0.920 | 65% |
|  | grade 7 | 0.920 | 65% |
| High Density |  | 0.935 | 75% |
|  |  | 0.950 | 80% |

For the method explained above by which the thickness of the plastic sheet is reduced, the material having the smaller degree of crystallization is preferred because it is difficult to achieve a sufficiently even thickness of the plastic sheet if the materials having the greater degrees of crystallization are used. It will be understood that if the thickness of a thin plastic sheet having a high degree of crystallization fluctuates, such fluctuations will have a relatively greater importance than fluctuations in thickness of a thicker sheet which on the other hand has a smaller degree of crystallization.

Instead of glass cover plates it is possible to use cover plates consisting of acrylic resin either frosted at the surface facing the plastic sheet and being smooth at the opposite surface or being smooth at both surfaces. In the first instance the cover plates are adhered to the plastic sheet by means of a clear lacquer and with the frosted surfaces facing the plastic sheet. In the latter case a lacquer wherein light diffusing particles are suspended is used in order to provide the light diffusing layers at both sides of the plastic sheet. Due to the fact that plates consisting of acrylic resin cannot be heated as explained above due to the development of gases the thickness of the plastic sheet cannot be reduced after the adhering of the cover plates to the intermediate plastic sheet. However, under such circumstances the plastic sheet may be manufactured by arranging a sheet of this material having a thickness greater than the finally required thickness between two smooth glass plates, heating the assembly and pressing the glass plates towards each other until the plastic sheet has achieved the thickness required. By chilling the assembly the different contractions of the glass plates and the plastic sheet will loosen the plastic sheet from the glass plates. The plastic sheet having the required thickness manufactured in this way may now be adhered between two plates consisting of acrylic resin by means of a lacquer with our without light diffusing particles depending on whether the acrylic plates are frosted or transparent. In the latter case projection screens having a size of 1 × 1 m² may be made. For the latter method also polyethylene having a density of approximately 0.920 g/cm³ can be used combined with a thickness of the lacquer layers of 40 $\mu$. The three sheets are pressed together between two cylinders using a high pressure, approximately 8 kg/cm², and as solvent for the lacquer a solvent may be used which is sold under the trademark "3M 4693" which will evaporate within 20 min.

When frosted cover plates are used the frosting may be provided in any way known to a man skilled within this art, e.g. by grinding, etching or by evaporating various materials onto the surface to be frosted.

We claim:

1. A screen for forming images projected thereon from a projector arranged at the rear side of the screen and viewed from the front side, said screen comprising in combination two cover sheets of transparent material adhered to opposite sides of an intermediate sheet consisting of light conducting partly crystallized plastic material, light diffusing layers being arranged at the interfaces between the intermediate sheet and the cover sheets, said cover sheets having smooth outer surfaces and said plastic material of said intermediate sheet being polyethylene having a density of 0.920 q/cm³, a degree of crystallization of 65 percent and a thickness between 0.5 and 0.7 mm. preferably 0.6 mm.

2. A screen according to claim 1, wherein the surfaces of the cover sheets adhered to the intermediate sheet are frosted for forming said light diffusing layers.

3. A screen according to claim 1, wherein the two cover sheets are smooth at both surfaces and are adhered to the intermediate layer by a transparent lacquer wherein light diffusing particles are suspended.

4. A screen according to claim 1, wherein the cover sheets consist of glass.

5. A screen according to claim 1, wherein the cover sheets consist of acrylic resin.

6. Method of making a screen for forming images projected thereon from a projector arranged at the rear side of the screen and viewed from the front side, comprising cover sheets consisting of glass wherein a sheet of light conducting partly crystallized plastic material having a thickness greater than the thickness finally required is placed between said glass sheets with a layer of lacquer interposed between each glass sheet and the plastic sheet, heating the assembly to a temperature above the softening temperature of the plastic sheet compressing the assembly until the required thickness of the plastic sheet is achieved, and chilling the assembly to room temperature.

7. Method according to claim 6, wherein both surfaces of said glass sheets are smooth, and wherein a lacquer having light refracting particles suspended therein is used.

8. Method according to claim 6, wherein the plastic sheet consists of polyethylene having a density of 0.920 g/cm³, a degree of crystallization of 65 percent and wherein the thickness thereof is reduced to 0.5–0.7 mm, preferably 0.6 mm.

* * * * *